United States Patent [19]

Püntener

[11] 4,453,942
[45] Jun. 12, 1984

[54] USE OF 1:2 COBALT COMPLEX DYES FOR DYEING LEATHER OR FURS

[75] Inventor: Alois Püntener, Rheinfelden, Switzerland

[73] Assignee: Ciba-Geigy Corporation, Ardsley, N.Y.

[21] Appl. No.: 448,571

[22] Filed: Dec. 10, 1982

[30] Foreign Application Priority Data

Dec. 21, 1981 [CH] Switzerland .................. 8158/81

[51] Int. Cl.$^3$ .................. C09B 56/02; D06P 3/32
[52] U.S. Cl. .................. 8/437; 8/404; 8/641; 8/683; 8/685
[58] Field of Search .................. 8/437, 685, 641

[56] References Cited

U.S. PATENT DOCUMENTS

| | | | |
|---|---|---|---|
| 3,468,618 | 9/1969 | Buehler et al. | 8/436 |
| 4,085,097 | 4/1978 | Beffa et al. | 260/145 A |
| 4,272,243 | 6/1981 | Lach et al. | 8/436 |
| 4,358,287 | 11/1982 | Wicki et al. | 8/540 |

FOREIGN PATENT DOCUMENTS

| | | |
|---|---|---|
| 260455 | 5/1963 | Australia . |
| 22067 | 1/1981 | European Pat. Off. . |
| 55808 | 7/1982 | European Pat. Off. . |
| 61670 | 10/1982 | European Pat. Off. . |
| 2918633 | 11/1980 | Fed. Rep. of Germany . |

*Primary Examiner*—A. Lionel Clingman
*Attorney, Agent, or Firm*—Edward McC. Roberts

[57] ABSTRACT

The dyes of the formula I given in claim 1 are suitable for dyeing furs and in particular leather.

They are preferably used in admixture with a blue dye and a red dye for the trichromatic dyeing of leather.

9 Claims, No Drawings

USE OF 1:2 COBALT COMPLEX DYES FOR DYEING LEATHER OR FURS

The invention relates to the use of dyes of the formula I

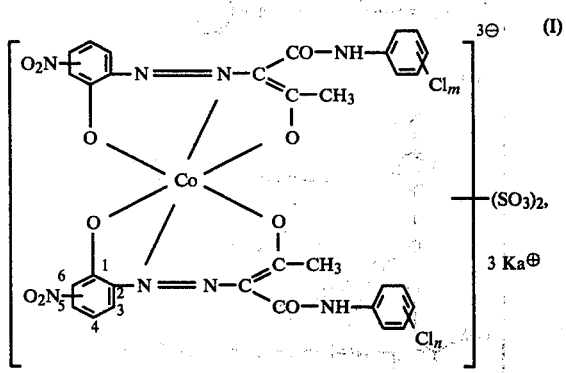

wherein $Ka^\oplus$ is a cation, and m and n independently of one another are each 1 or 2, for dyeing leather or furs.

$Ka^\oplus$ is a cation, for example an alkali metal cation, such as lithium, potassium or especially sodium. $Ka^\oplus$ can also be an ammonium cation, or the ammonium salt of an organic amine.

The nitro groups are preferably arranged in the 4-, 5- or 6-position of the diazo components, particularly in the 4-position, and m and n are preferably each 1.

The sulfo groups are preferably in the diazo components, especially in the 6-position.

In the 1:2 cobalt complex dyes of the formula I, the two azo dyes can be different from one another, but preferably they are identical to each other.

Preferred diazo components for the dyes of the formula I are: 1-hydroxy-2-amino-4-nitrobenzene-6-sulfonic acid, 1-hydroxy-2-amino-6-nitrobenzene-4-sulfonic acid, 1-hydroxy-2-amino-4-nitrobenzene or 1-hydroxy-2-amino-5-nitrobenzene.

Suitable coupling components are for example the following: acetoacetic acid-2-chloroanilide, acetoacetic acid-3-chloroanilide, acetoacetic acid-4-chloroanilide, acetoacetic acid-2,5-dichloroanilide, acetoacetic acid-2-chloro-5-sulfoanilide or acetoacetic acid-4-chloro-5-sulfoanilide.

The 1:2 cobalt complexes are produced in the customary manner, for example by reacting the metal-free azo dyes, in the ratio of 1:2, with an agent releasing cobalt. For introducing the metal, there are generally used cobalt-(II) salts, such as cobalt sulfate, cobalt acetate or cobalt chloride—with or without the addition of oxidising agents—or the cobalt-(III)-amine complex.

The salts mentioned above can also be used in the presence of complexing agents, for example tartaric acid, salicylic acid or lactic acid. The agents releasing cobalt are used in a stoichiometric amount or in excess. Both mixtures and homogeneous monoazo dyes can be metallised. In the first case is obtained a mixture of symmetrical and asymmetrical metal complexes.

The 1:2 cobalt complexes are used for dyeing furs or preferably leather, all types of leather being suitable, for example chrome leather, re-tanned leather or suède leather of the goat, cow or pig. These dyes are distinguished in particular by a good build-up on leather.

Highly coloured, yellow or yellowish-brown to orange-brown dyeings having very good fastness properties, especially fastness to light and to wet processing, are obtained.

The preferred use of the dyes is for the dyeing of leather with dye mixtures, particularly where the dyes are used in admixture with a suitable blue 1:2 metal complex dye and a suitable red 1:2 metal complex dye, thus making possible the trichromatic dyeing of leather.

There is preferably used a dye mixture containing:

(a) a yellowish-brown 1:2 cobalt complex of the above formula I, (b) a blue or violet 1:2 chromium- or cobalt-complex of the dye of the formula II

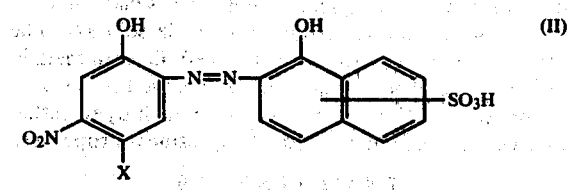

wherein X is hydrogen, chlorine, methyl or methoxy, and (c) a red or reddish-brown 1:2 chromium- or cobalt-complex of the dye of the formula III

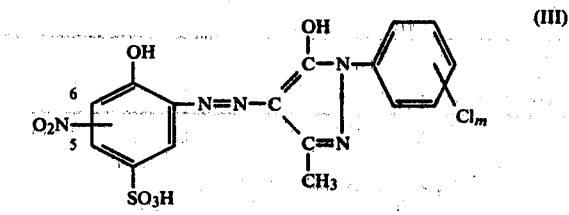

wherein m is an integer from 0 to 2, and the nitro group is arranged in the 5- or 6-position.

The Examples which follow serve to further illustrate the invention, without the scope thereof being limited to them. 'Parts' are parts by weight, and percentages are percent by weight.

EXAMPLE 1

100 parts of garment suède leather are wetted back for 2 hours at 50° C. in a solution of 1000 parts of water and 2 parts of 24% ammonia; and the material is subsequently dyed for 1 hour at 60° C. in a solution of 1000 parts of water, 2 parts of 24% ammonia and 3 parts of the dye of the formula

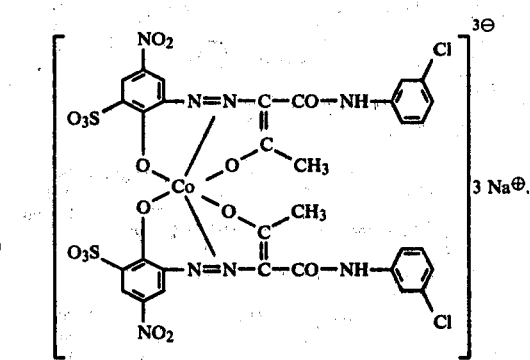

There is then added a solution of 40 parts of water and 4 parts of 85% formic acid, and dyeing is continued for a further 30 minutes. The leather is afterwards well rinsed, and optionally treated with 2 parts of a dicyanodiaminoformaldehyde condensation product for 30 minutes at 50° C. A yellow dyeing having excellent fastness properties is obtained.

The employed dye was produced in the following manner:

91 parts of the monoazo dye, obtained by coupling of diazotised 4-nitro-2-amino-1-hydroxybenzene-6-sulfonic acid with acetoacetic acid-3-chloroanilide, are introduced with 4 parts of sodium hydroxide into 1000 parts of water at 80° C.; there are then added 30 parts of 1-nitrobenzene-3-sulfonic acid and 60 parts of a 1 molar cobalt sulfate solution, and the pH value is maintained at 7 to 9 with 2 molar sodium hydroxide solution. The reaction solution is stirred at 80° to 90° C. until metallisation is completed. The water is removed in a rotary evaporator to thus obtain a powder which dyes leather in a yellow shade having excellent fastness properties.

EXAMPLES 2 TO 9

When the procedure is carried out as described in Example 1 except that the 1:2 cobalt complexes of the dyes listed in the following Table are used, there is obtained in each case leather dyed, with good fastness properties, in the shades given.

| Example | Monoazo dye | Shade |
|---|---|---|
| 2 | 2-hydroxy-3-sulfo-5-nitrophenyl-azo-acetoacetic acid-2-chloroanilide | yellow |
| 3 | 2-hydroxy-3-sulfo-5-nitrophenyl-azo-acetoacetic acid-4-chloroanilide | yellow |
| 4 | 2-hydroxy-3-sulfo-5-nitrophenyl-azo-acetoacetic acid-2,5-dichloroanilide | yellow |
| 5 | 2-hydroxy-5-nitrophenyl-azo-acetoacetic acid-(3-sulfo-4-chloro)anilide | yellowish-brown |
| 6 | 2-hydroxy-4-nitrophenyl-azo-acetoacetic acid-(3-sulfo-4-chloro)anilide | reddish-brown |
| 7 | 2-hydroxy-3-nitro-5-sulfophenyl-azo-acetoacetic acid-3-chloroanilide | orange-brown |
| 8 | 2-hydroxy-5-nitrophenyl-azo-acetoacetic acid-(3-sulfo-4-chloro)anilide variant | yellowish-brown |
| 9 | 1:2 cobalt complex (mixed) — see structures | — |

The dye mixture according to Example 9 was obtained as follows:

45.5 parts of the monoazo dye, obtained by coupling of diazotised 4-nitro-2-amino-1-hydroxybenzene-6-sulfonic acid with acetoacetic acid-3-chloroanilide, and 49 parts of the monoazo dye, produced analogously from the same diazo component and acetoacetic acid-2,5-dichloroanilide as coupling component, are metallised in a manner analogous to that described in Example 1, and subsequently isolated.

EXAMPLE 10

100 parts of chrome-tanned garment suède leather having a shaved thickness of 0.9 mm are wetted back in an ordinary drum-shaped glass vessel containing 1000 parts of water and 2 parts of 24% ammonia for 60 minutes at 50° C. This treatment is followed by a washing process of 15 minutes duration in 1000 parts of water at 50° C.

After these preliminary operations, the leather is dyed at 50° C. in a liquor consisting of 1000 parts of water, 2 parts of 24% ammonia, 0.28 part of the yellow dye of Example 2, 0.23 part of the red dye of the formula

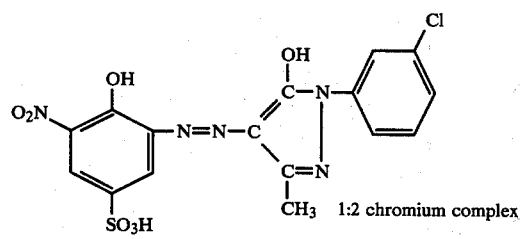

and 0.125 part of the blue dye of the formula

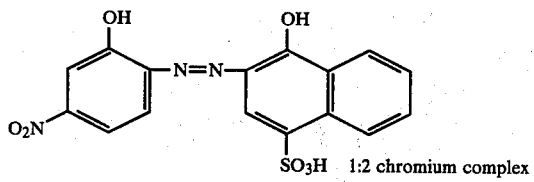

After a dyeing time of 60 minutes, the dye liquor is acidified with 2 parts of 85% formic acid diluted with 20 parts of water, and dyeing is continued for 20 minutes.

The finishing of the dyed leather is performed, in the customary manner, after thorough rinsing in fresh water and optionally a treatment with 2 parts of a dicyanodiaminoformaldehyde condensation product for 30 minutes at 50° C.

The dyed leather obtained displays a medium brown shade. The dyeing is distinguished by good levelness and fastness properties, especially good fastness to light.

What is claimed is:

1. A process of dyeing, comprising the application of a dye of the formula

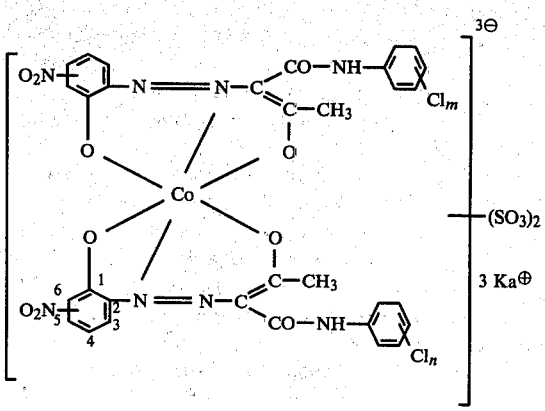

wherein $Ka^{\oplus}$ is a cation and m and n independently of one another are each 1 or 2, to leather or furs.

2. The process of claim 1 wherein the nitro groups of the dye are in the 4-, 5- or 6-positions of the diazo components.

3. The process of claim 1 wherein m and n are each 1.

4. The process of claim 1 wherein the sulfo groups of the dye are in the diazo components.

5. The process of claim 1 wherein the two azo dyes bound to cobalt are identical to one another.

6. The process of claim 1 wherein the dye is applied to leather.

7. The process of claim 1, wherein the dye mixture further containing a blue or violet 1:2 chromium- or cobalt-complex of the formula

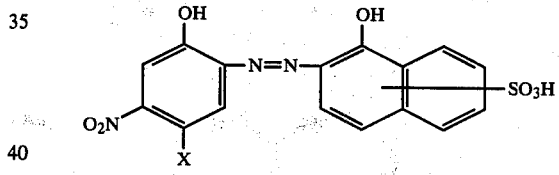

wherein X is hydrogen, chlorine, methyl or methoxy, and a red or reddish-brown 1:2 chromium- or cobalt-complex of the formula

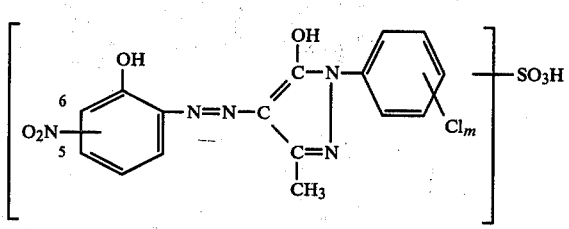

wherein m is an integer from 0 to 2, and the nitro group is in the 5- or 6-position.

8. The process of claim 2, wherein the nitro groups of the dye are in the 4-positions of the diazo components.

9. The process of claim 4, wherein the sulfo groups of the dye are in the 6-positions of the diazo components.

* * * * *